(12) United States Patent
Murayama et al.

(10) Patent No.: US 12,726,941 B2
(45) Date of Patent: Sep. 1, 2026

(54) CONTROL APPARATUS, RADIO COMMUNICATION SYSTEM, AND CONTROL METHOD

(71) Applicant: NTT, Inc., Tokyo (JP)

(72) Inventors: Daisuke Murayama, Tokyo (JP); Toshiro Nakahira, Tokyo (JP); So Takatani, Tokyo (JP); Takatsune Moriyama, Tokyo (JP)

(73) Assignee: NTT, Inc., Tokyo (JP)

( * ) Notice: Subject to any disclaimer, the term of this patent is extended or adjusted under 35 U.S.C. 154(b) by 232 days.

(21) Appl. No.: 18/832,246

(22) PCT Filed: Feb. 15, 2022

(86) PCT No.: PCT/JP2022/005899

§ 371 (c)(1),
(2) Date: Jul. 23, 2024

(87) PCT Pub. No.: WO2023/157062

PCT Pub. Date: Aug. 24, 2023

(65) Prior Publication Data

US 2025/0133534 A1 Apr. 24, 2025

(51) Int. Cl.
*H04W 24/00* (2009.01)
*H04W 16/18* (2009.01)
(Continued)

(52) U.S. Cl.
CPC ......... *H04W 64/006* (2013.01); *H04W 16/18* (2013.01); *H04W 28/0226* (2013.01); *H04W 84/005* (2013.01)

(58) Field of Classification Search
CPC .... G01C 21/20; G01C 21/3415; G01C 21/34; G01C 21/28; H04W 64/003; H04W 16/24; H04W 64/006
(Continued)

(56) References Cited

U.S. PATENT DOCUMENTS

2019/0063938 A1* 2/2019 Fukushima .......... G01C 21/343
2022/0107186 A1* 4/2022 Okabe .................... G01C 21/20
(Continued)

OTHER PUBLICATIONS

Toshiro Nakahira, Motoharu Sasaki, Takatsune Moriyama, Yasushi Takatori, "Dynamic Radio Control Using Movable Base Stations in Multi-Radio Proactive Control Technologies (Cradio)", NTT Access Network Service Systems Laboratories, NTT Corporation, IEICE Technical Report, Jan. 20, 2021, pp. 12-17.

*Primary Examiner* — Khai Tran
(74) *Attorney, Agent, or Firm* — IPUSA, PLLC

(57) ABSTRACT

A control apparatus for controlling movable wireless stations, the control apparatus includes a first calculation unit configured to calculate combination candidates of movement routes of a plurality of movable wireless stations where a distance between the movement routes of the plurality of movable wireless stations is equal to or more than a first distance or a maximum distance, a second calculation unit configured to calculate combination candidates of movement timing and movement speed where the distance between the plurality of movable wireless stations becomes equal to or more than a second distance or a maximum distance from the combination candidates of the movement routes of the plurality of movable wireless stations, and a movement instruction unit configured to instruct the plurality of movable wireless stations to move by using a combination where a movement time or a movement distance of the plurality of movable wireless stations is the minimum or a combination where a movement time or a movement distance of the plurality of movable wireless stations is equal to or less than a predetermined value among the combination candidates calculated by the first calculation unit or the second calculation unit.

7 Claims, 10 Drawing Sheets

(51) Int. Cl.
*H04W 28/02* (2009.01)
*H04W 64/00* (2009.01)
*H04W 84/00* (2009.01)

(58) Field of Classification Search
USPC ........................................................ 455/456.1
See application file for complete search history.

(56) References Cited

U.S. PATENT DOCUMENTS

2023/0262575 A1* 8/2023 Kobayashi ............ H04W 24/10 370/328
2025/0029500 A1* 1/2025 Tanaka ..................... G08G 5/32

* cited by examiner

CONTROL APPARATUS, RADIO COMMUNICATION SYSTEM, AND CONTROL METHOD

TECHNICAL FIELD

The present invention relates to a control device (control apparatus), a wireless communication system (radio communication system), and a control method.

BACKGROUND ART

Wireless network control technique that dynamically forms a wireless communication area in accordance with a communication request, a wave environment, or the like by using a plurality of movable wireless stations in which a wireless base station or a wireless relay station is mounted on a movable device has been proposed (see, for example, NPL 1).

CITATION LIST

Non Patent Literature

[NPL 1] Toshiro Anahita, Motoharu Sasaki, Takatsune Moriyama, Yasushi Takatori, "Dynamic Radio Control Using Movable Base Stations in Multi-Radio Proactive Control Technologies (Cradio)", IEICE Technical Report, 20 Jan. 2021

SUMMARY OF INVENTION

Technical Problem

The technique disclosed in NPL 1 can optimize an arrangement of the movable wireless stations in accordance with changes in the wireless environment, but does not consider area quality during movement of the movable wireless station. Therefore, for example, when moving the movable wireless station to a movement destination, the movable wireless station concentrates on a specific place, and a problem such as deterioration of communication quality due to interference between cells, or reduction in utilization efficiency of wireless resources may occur.

Embodiments of the present invention have been made in view of the above problems, and reduce occurrence of the problem such as degradation of the communication quality due to the interference between cells, or reduction in the utilization efficiency of the wireless resources during the movement of the movable wireless station in the wireless communication system including the movable wireless stations.

Solution to Problem

In order to solve the above problem, a control device according to an embodiment of the present invention is a control device that controls movable wireless stations, and includes a first calculation unit configured to calculate combination candidates of movement routes of a plurality of movable wireless stations where a distance between the movement routes of the plurality of movable wireless stations is equal to or more than a first distance or the maximum, a second calculation unit configured to calculate combination candidates of movement timing and movement speed where a distance between the plurality of movable wireless stations is equal to or more than a second distance or the maximum from the combination candidates of the movement routes of the plurality of movable wireless stations, and a movement instruction unit configured to instruct the plurality of movable wireless stations to move by using a combination where a movement time or a movement distance of the plurality of movable wireless stations is the minimum or a combination where the movement time or the movement distance of the plurality of movable wireless stations is equal to or less than a predetermined value among the combination candidates calculated by the first calculation unit or the second calculation unit.

Advantageous Effects of Invention

According to an embodiment of the present invention, in the wireless communication system including the movable wireless stations, it is possible to reduce the occurrence of the problem such as the degradation of the communication quality due to the interference between the cells, or the reduction in the utilization efficiency of the wireless resources during the movement of the movable wireless station.

DESCRIPTION OF EMBODIMENTS

Hereinafter, an embodiment of the present invention (the present embodiment) will be described with reference to the drawings. The embodiment described hereinafter is merely an example, and an embodiment to which the present invention is applied is not limited to the following embodiment.

<System Configuration>

Figure 1:
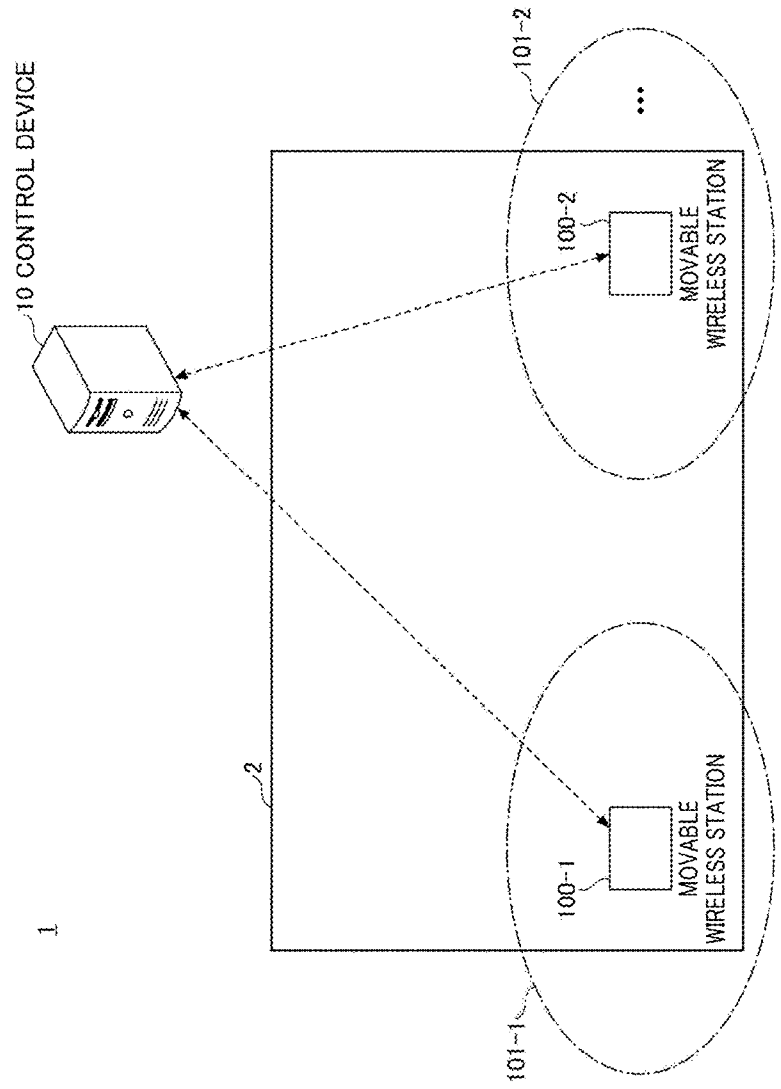
FIG. 1 is a diagram showing an example of a system configuration of a wireless communication system according to a present embodiment.

FIG. 1 is a diagram showing an example of a system configuration of a wireless communication system according to the present embodiment. The wireless communication system 1 (radio communication system) includes a plurality of movable wireless stations 100-1, 100-2, . . . in which a wireless base station or a wireless relay station is mounted on a movable device and a control device 10 (control apparatus) that controls the plurality of movable wireless stations 100-1, 100-2, . . . . Note that, in the following description, when an arbitrary movable wireless station is indicated among the plurality of movable wireless stations 100-1, 100-2, . . . , a "movable wireless station 100" is used.

The movable wireless station 100 has a function of a wireless base station that performs wireless communications with user terminals used by users, for example, by 5G (5th. Generation), LTE (Long Term Evolution), or the like, or a wireless relay station that relays wireless communications. In addition, the movable wireless station 100 is communicatively connected to the control device 10, and is configured to be movable, for example, in a predetermined area 2 on a predetermined movement route in response to an instruction from the control device 10.

The control device 10 is an information processing device having a configuration of a computer or a system including a plurality of computers, instructs a plurality of movable wireless stations 100 to move by executing a predetermined program, and dynamically forms a wireless communication area.

The above-described configuration allows the control device 10 to form an optimal wireless communication area in accordance with, for example, a communication request or a wireless wave environment or the like. However, when the conventional technique as shown in NPL 1 is applied as it is, communication quality in the wireless communication area may be temporarily deteriorated during movement of the movable wireless station 100, for example.

Figure 2:
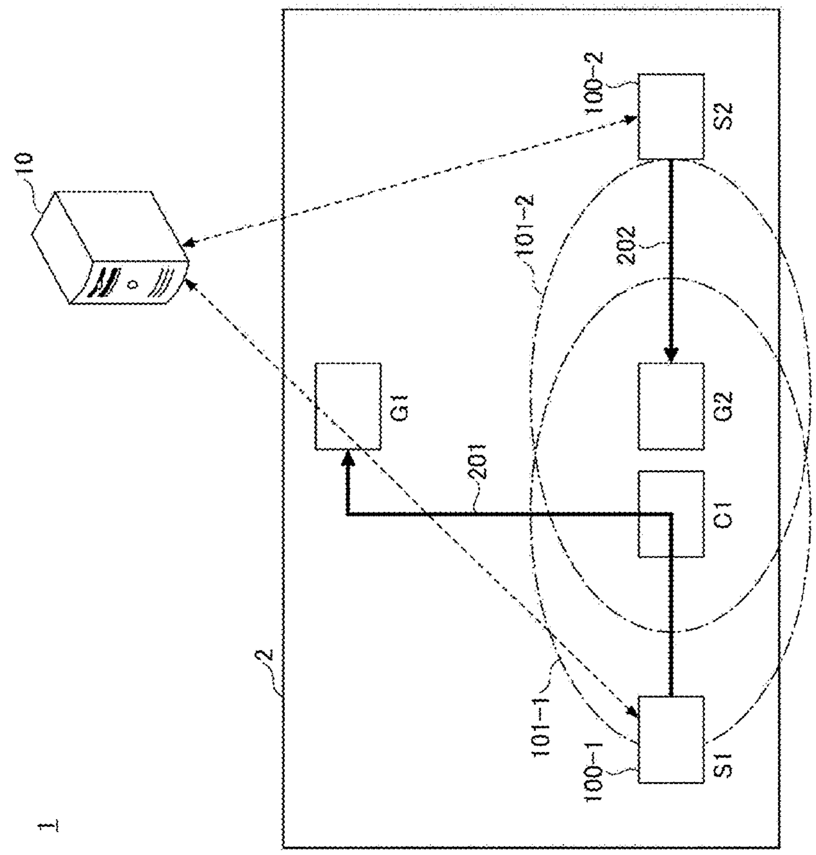
FIG. 2 is a diagram for explaining a problem according to the present embodiment.

For example, as shown in FIG. 2, the control device 10 moves the movable wireless station 100-1 from a movement source S1 to a movement destination G1 on a movement route 201, and moves the movable wireless station 100-2 from the movement source S2 to the movement destination G2 on the movement route 202.

In this case, when the movable wireless station 100-1 passes an intermediate point Cl, the movable wireless station 100-1 and the movable wireless station 100-2 are temporarily close to each other, which may cause, for example, occurrence of a problem such as degradation of the communication quality due to interference between cells, or reduction in utilization efficiency of wireless resources, for example. Thus, when the control device 10 moves the movable wireless station 100 to the movement destination, for example, simply moving at the shortest distance may result in deterioration of the communication quality during the movement of the movable wireless station 100.

Therefore, the control device 10 according to the present embodiment has a function of selecting the movement route of the movable wireless station 100 so that the communication quality deterioration due to the interference between the cells or the like does not occur (or hardly occurs) during the movement of the movable wireless station 100.

For example, the control device 10 executes first calculation processing that calculates combination candidates of the movement routes of the plurality of movable wireless stations 100 where the distance between the movement routes of the plurality of movable wireless stations 100 to be moved is equal to or more than a predetermined distance (first distance), or the maximum.

Further, the control device 10 executes second calculation processing that calculates combination candidates of movement timing and movement speed where the distance between the plurality of movable wireless stations 100 is equal to or more than a predetermined distance (second distance) or the maximum from the combination candidates of the movement routes of the plurality of movable wireless stations 100.

Here, the first distance and the second distance are predetermined distances so that the deterioration of the communication quality due to the interference between the cells of the plurality of movable wireless stations 100 is equal to or less than a predetermined value. Note that the first distance and the second distance may be the same distance or different distances.

Further, the control device 10 executes selection processing that selects a combination where a movement time or a movement distance of the plurality of movable wireless stations 100 is the minimum, or a combination where the movement time or the movement distance of the plurality of movable wireless stations 100 is equal to or less than a predetermined value among the combination candidates calculated by the first calculation processing or the second calculation processing.

Figure 3:
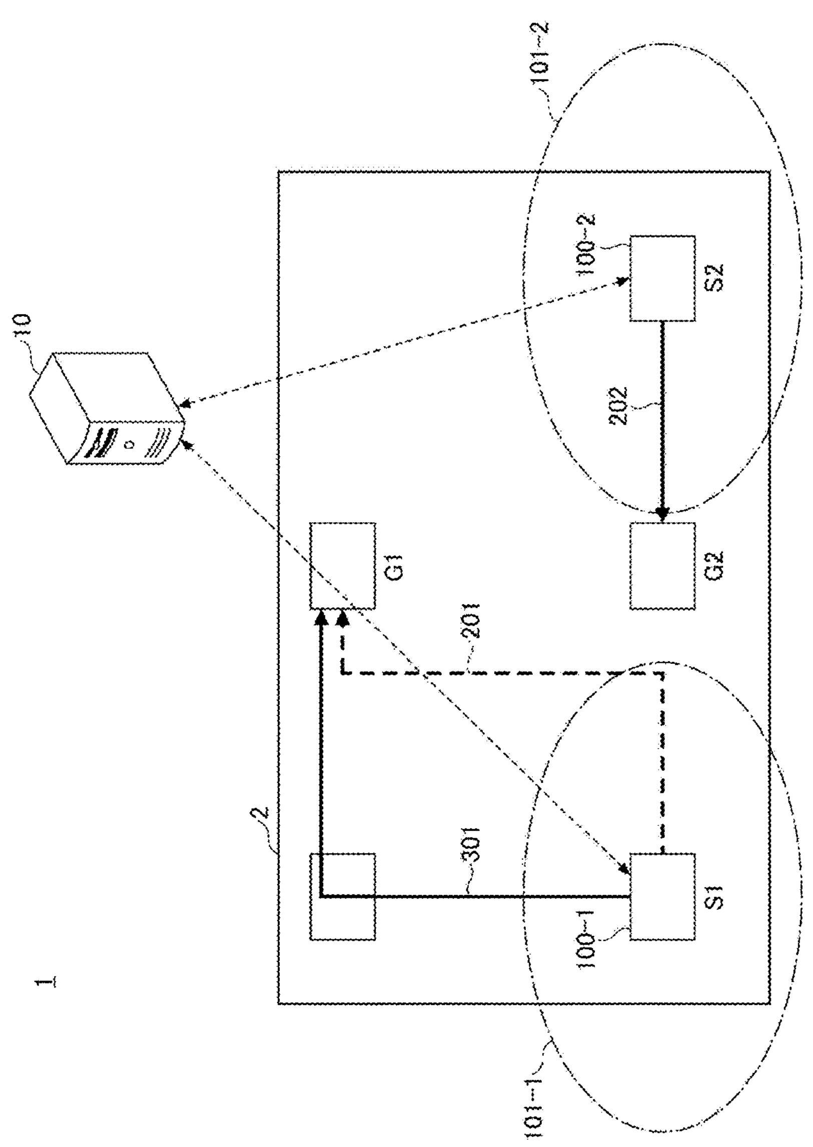
FIG. 3 is a diagram for explaining an overview of processing according to the present embodiment.

Thus, as shown in FIG. 3, for example, the control device 10 selects the combination of the movement route 301 of the movable wireless station 100-1 and the movement route 202 of the movable wireless station 100-2 so that the movable wireless station 100-1 and the movable wireless station 100-2 are not close to each other. In addition, the control device 10 executes movement instruction processing that instructs the plurality of movable wireless stations 100-1 and 100-2 to move by using the combination selected by the selection processing.

The above-described processing allows the wireless communication system 1 including the movable wireless stations 100, by the present embodiment, to reduce the occurrence of the problem such as the degradation of the communication quality due to the interference between the cells or the reduction in the utilization efficiency of the wireless resources during the movement of the movable wireless station 100.

<Functional Configuration>

Figure 4:
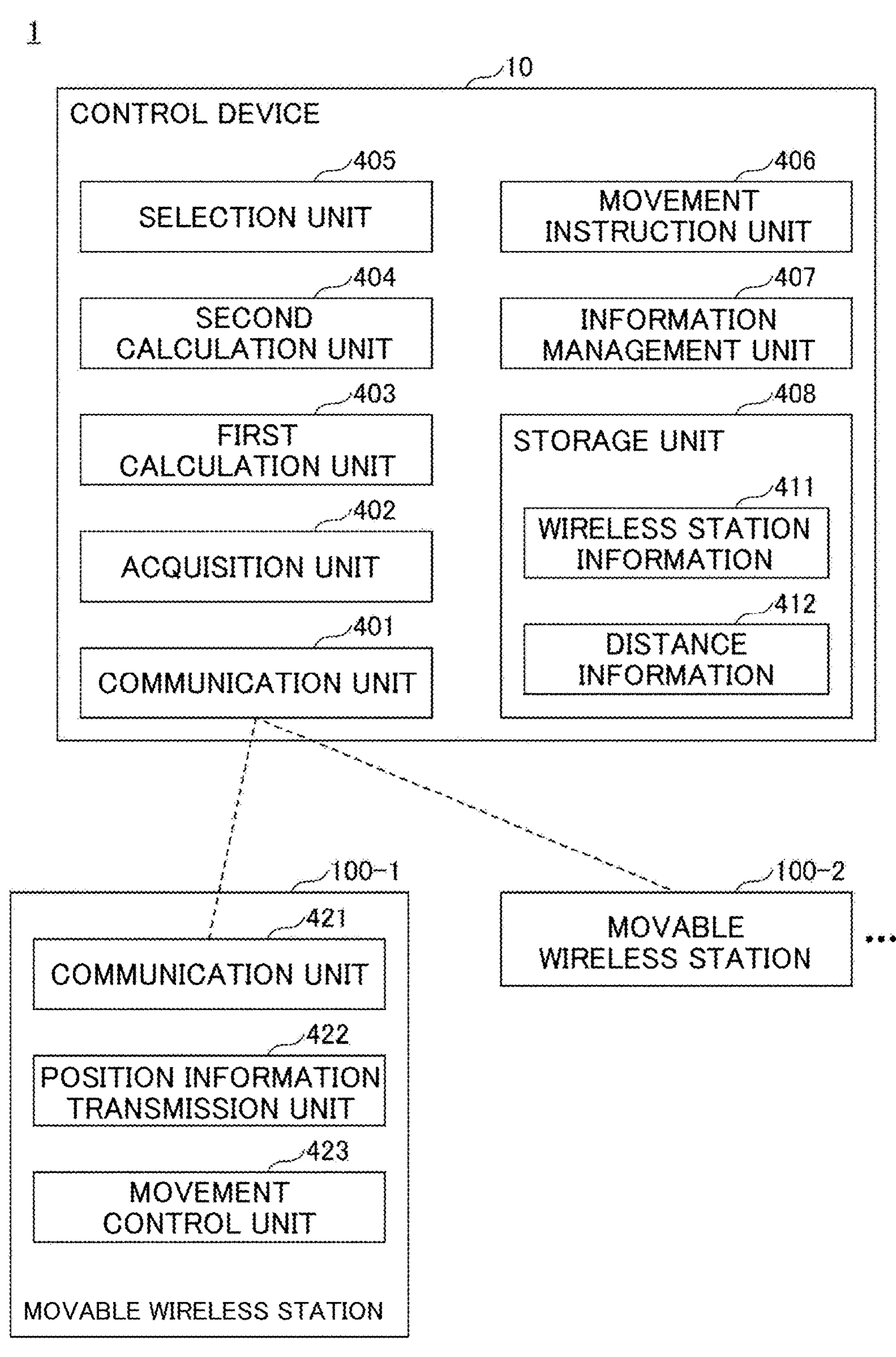
FIG. 4 is a diagram showing an example of a functional configuration of the wireless communication system according to the present embodiment.

Subsequently, a functional configuration of the wireless communication system 1 according to the present embodiment will be described. FIG. 4 is a diagram showing an example of the functional configuration of the wireless communication system according to the present embodiment. Note that, in FIG. 4, it is assumed that the movable wireless station 100-2 has the same functional configuration as that of the movable wireless station 100-1.

(Functional Configuration of Control Device)

The control device 10 has a computer configuration, and the computer executes a predetermined program to realize, for example, a communication unit 401, an acquisition unit 402, a first calculation unit 403, a second calculation unit 404, a selection unit 405, a movement instruction unit 406, an information management unit 407, a storage unit 408, and the like. Note that at least some of the functional configurations described above may be realized by hardware.

The communication unit 401 performs communication processing that communicates with the plurality of movable wireless stations 100.

The acquisition unit 402 acquires position information indicating current positions of the plurality of movable wireless stations 100 via the communication unit 401. Also, the acquisition unit 402 acquires, for example, candidates or the like of the movement routes of the plurality of movable wireless stations 100 to be moved from wireless station information 411 or the like stored in the storage unit 408.

The first calculation unit 403 executes the first calculation processing that calculates the combination candidates of the movement routes of the plurality of movable wireless stations 100 where the distance between the movement routes of the plurality of movable wireless stations 100 to be moved is equal to or more than the predetermined first distance or the maximum. Preferably, the first calculation unit 403 executes the first calculation processing when there is a plurality of options in the movement routes of the plurality of movable wireless stations 100 to be moved.

The second calculation unit 404 executes the second calculation processing that calculates the combination candidates of the movement timing and the movement speed where the distance between the plurality of movable wireless stations 100 is equal to or more than the predetermined second distance or the maximum from the combination candidates of the movement routes of the plurality of movable wireless stations 100. Preferably, the second calculation unit 404 executes the second calculation processing when there is a plurality of options in the movement timing and the movement speed of the plurality of movable wireless stations 100.

Preferably, when the first calculation unit 403 executes the first calculation processing, the second calculation unit 404 calculates the combination candidates of the movement timing and the movement speed of the plurality of movable wireless stations 100 from the combination candidates of the movement routes of the plurality of movable wireless stations 100 calculated by the first calculation unit 403. Note that when the first calculation unit 403 does not execute the first calculation processing, the second calculation unit 404 calculates the combination candidates of the movement timing and the movement speed of the plurality of movable wireless stations 100 from the combination candidates of the movement routes of the plurality of movable wireless stations 100 acquired by the acquisition unit 402.

The selection unit 405 executes the selection processing that selects the combination where the movement time or the movement distance of the plurality of movable wireless stations 100 is the minimum, or the combination where the movement time or the movement distance of the plurality of movable wireless stations 100 is equal to or less than the predetermined value among the combination candidates calculated by the first calculation unit 403 or the second calculation unit 404.

The movement instruction unit 406 executes the movement instruction processing that instructs the plurality of movable wireless stations 100 to move by using the combination selected by the selection unit 405. For example, the movement instruction unit 406 transmits the movement instruction for instructing the plurality of movable wireless stations 100 to move in accordance with the combinations of the movement routes or the combinations of the movement timing and the movement speed of the plurality of movable wireless stations 100 selected by the selection unit 405 to the plurality of movable wireless stations 100 via the communication unit 401.

The information management unit 407 stores and manages, for example, information such as wireless station information 411 and distance information 412 in the storage unit 408. The wireless station information 411 includes, for example, information on movement candidate points to be candidates of the movement destinations of the plurality of movable wireless stations 100, information on the movement routes, and the like. In addition, the distance information 412 includes, for example, information on the first distance, the second distance, and the like.

The storage unit 408 is realized by, for example, the program executed by the computer included in the control device 10, a storage device of the computer, and the like, and stores various information such as the wireless station information 411, the distance information 412, data, programs and the like.

Note that the functional configuration of the control device 10 shown in FIG. 4 is an example. For example, the first calculation unit 403 and the second calculation unit 404 may be one calculation unit, or the function of the selection unit 405 may be included in the movement instruction unit 406. In addition, the storage unit 408 may be realized by a storage server or the like external to the control device 10. Further, each functional configuration of the control device 10 shown in FIG. 4 may be divided into a plurality of devices and provided.

(Functional Configuration of Movable Wireless Station)

The movable wireless station 100 has a computer configuration, and the computer executes a predetermined program to realize, for example, a communication unit 421, a position information transmission unit 422, and a movement control unit 423. Note that at least some of the functional configurations described above may be realized by the hardware.

The communication unit 421 executes the first communication processing that communicates with the control device 10. In addition, the communication unit 421 executes the second communication processing that performs the wireless communications with user terminals 102 or the like. Note that the first communication method and the second communication method may be the same communication method or different communication methods.

The position information transmission unit 422 acquires the position information indicating the positions of the movable wireless stations 100, and executes position information transmission processing that transmits the acquired position information to the control device 10. The movement control unit 423 executes movement control processing that controls movable devices included in the movable wireless stations 100 so as to move the movable wireless stations 100 to points instructed by the control device 10.

<Flow of Processing>

Subsequently, a flow of processing of a control method according to the present embodiment will be described.

Example 1

Figure 5:
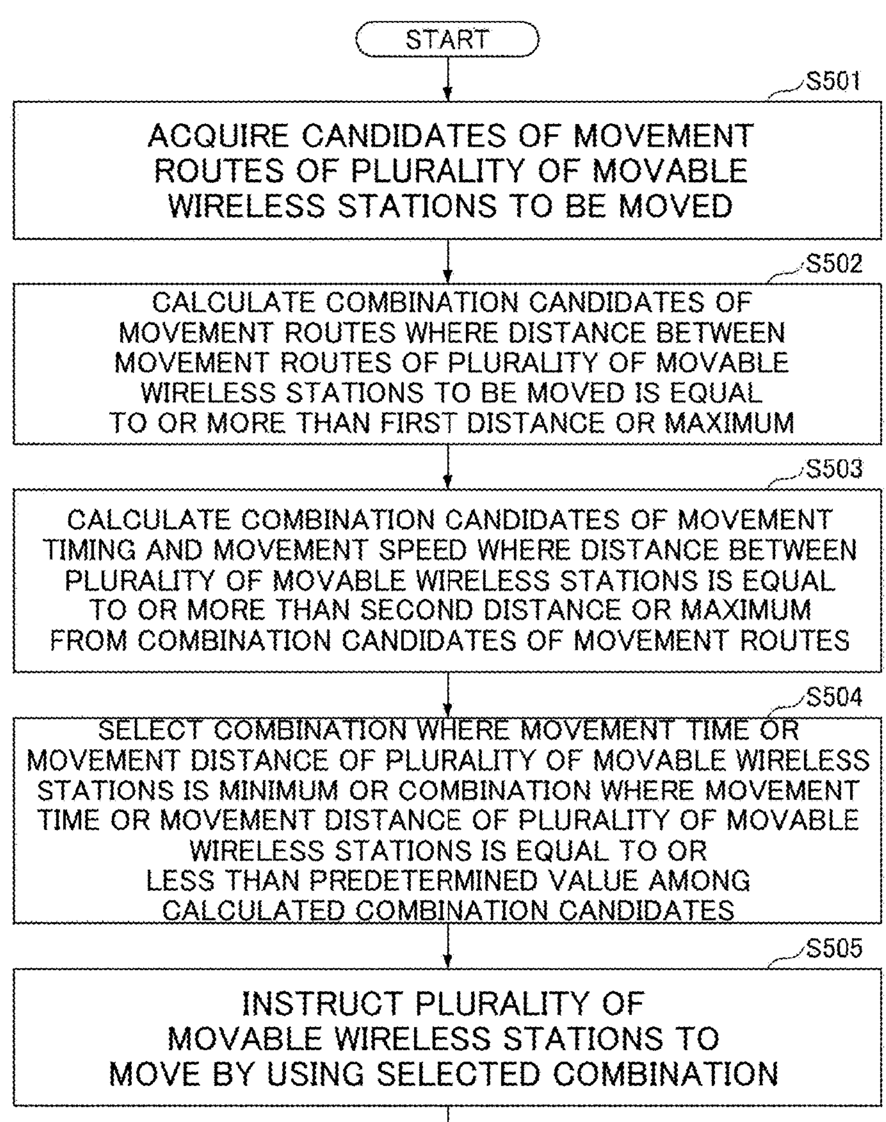
FIG. 5 is a flowchart showing an example of processing of a control device according to an example 1.

FIG. 5 is a flowchart showing an example of processing of the control device according to the example 1. This processing shows an example of the processing executed by the control device 10 having the functional configuration described in FIG. 4.

In a step S501, the acquisition unit 402 acquires the candidates of the movement routes of the plurality of movable wireless stations 100 to be moved from, for example, the wireless station information 411 stored in the storage unit 408.

Figure 6:
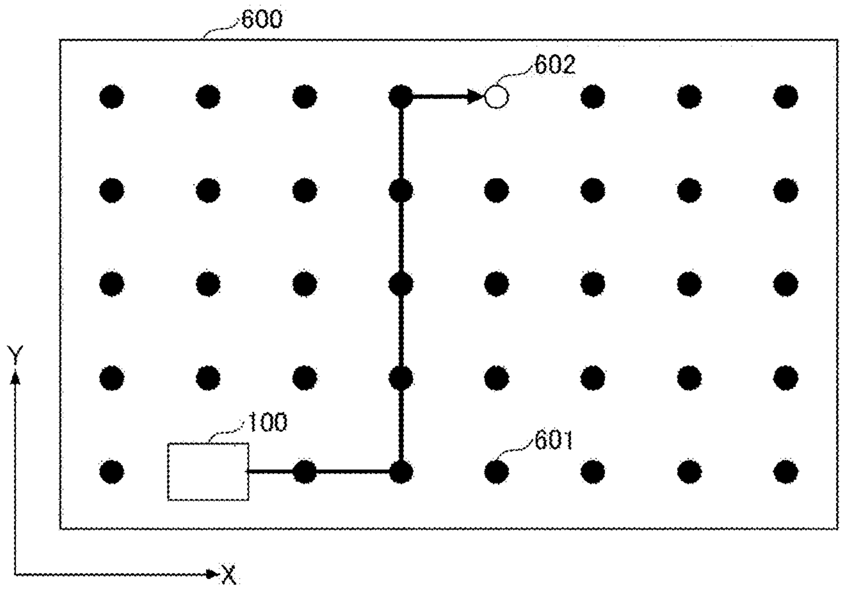
FIG. 6 is a diagram showing an example of candidates of movement routes according to the example 1.

FIG. 6 is a diagram showing an example of the candidates of the movement routes according to the example 1. As an example, it is assumed that the movable wireless station 100 can move to a movement candidate point 601 of the movable wireless station 100 set within a movable range 600 of the movable wireless station 100, as shown in FIG. 6. In addition, for example, in FIG. 6, when moving the movable wireless station 100 to a movement destination 602, the control device 10 moves the movable wireless station 100 to the movement destination 602 by repeatedly performing the movement processing in which the movable wireless station 100 is moved to the movement candidate point 601 adjacent to the movable wireless station 100 in the X direction or the Y direction.

In this case, the acquisition unit 402 acquires one or more movement routes where the movement distance is the minimum or equal to or less that the predetermined value as the candidates of the movement routes among the movement routes form the current position of the movable wireless station 100 to the movement destination 602.

However, the movement route of the movable wireless station 100 shown in FIG. 6 is an example. For example, the movable wireless station 100 may be freely movable along a predetermined route such as a path or a track, or the like.

In a step S502, the first calculation unit 403 calculates the combination candidates of the movement routes of the plurality of movable wireless stations 100 where the distance between the movement routes of the plurality of movable wireless stations 100 to be moved is equal to or more than the predetermined first distance or the maximum.

Figure 7:
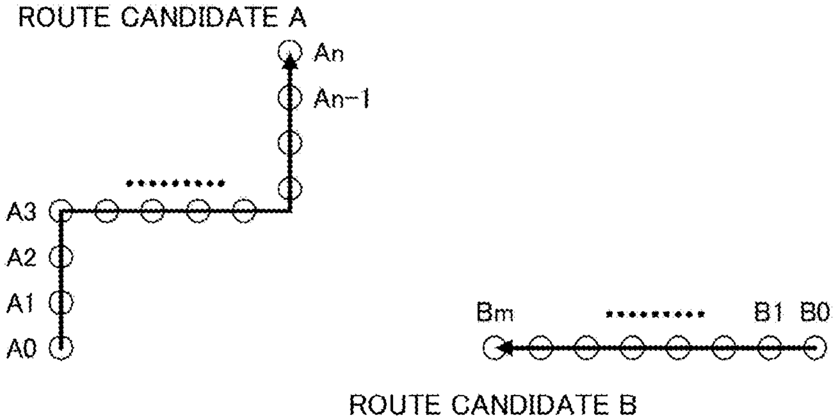
FIG. 7 is a diagram for explaining a distance between the movement routes according to the example 1.

FIG. 7 is a diagram for explaining the distance between the movement routes according to the example 1. Here, the distance between the movement routes of the plurality of movable wireless stations 100 is a distance between points on the movement route in which the movement routes of the plurality of movable wireless stations 100 are closest to each other.

For example, when calculating the distance between the route candidates A and B shown in FIG. 7, the distance between two points is calculated for all combinations of points (A0, A1, . . . ) on the route candidate A and points (B0, B1, . . . ) on the route candidate B, and the minimum value thereof is defined as the distance between the route candidates A and B.

Figure 8:
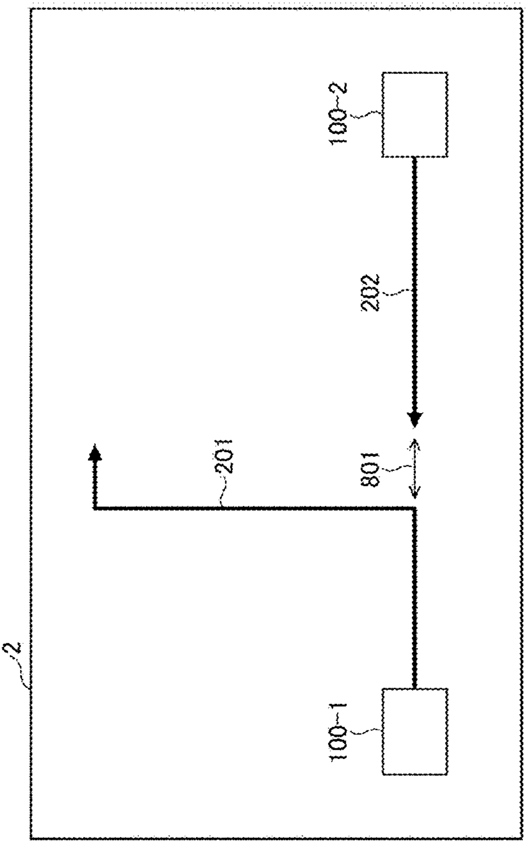
FIG. 8 is a diagram showing an example of a distance between the movement routes of movable wireless stations according to the example 1.

Thus, for example, the distance between the movement route 201 of the movable wireless station 100-1 and the movement route 202 of the movable wireless station 100-2 described in FIG. 2 can be expressed as a distance 801 in FIG. 8.

The first calculation unit 403 calculates the distance between the movement routes for all combinations of the movement route candidates of the movable wireless station 100-1 and the movement route candidates of the movable wireless station 100-2, for example. Also, the first calculation unit 403 sets the combinations of the movement routes where the calculated distance is equal to or more than the first distance as the combination candidates of the movement routes of the plurality of movable wireless stations 100-1 and 100-2. Note that when there is no combination of the movement routes where the calculated distance is equal to or more than the first distance, the first calculation unit 403 sets the combinations of the movement routes where the calculated distance is the maximum as the combination candidate of the movement routes of the plurality of movable wireless stations 100-1 and 100-2.

Note that, in the above-described description, the minimum configuration in which the number of movable wireless stations 100 is two has been described. When the number of the movable wireless stations 100 becomes three or more, the distance between the candidates of the movement routes of the movable wireless stations 100 is calculated for all combinations by taking out two specific routes. Also, in this case, the combination of the movement routes where the distance is the maximum value or equal to or more than the threshold value may be selected as the candidates of the movement routes of the movable wireless stations 100 for two movable wireless stations 100 where the distance between candidates of the movement route of the movable wireless stations 100 is the minimum.

In a step S503, the second calculation unit 404 calculates the combination candidates of the movement timing and the movement speed where the distance between the plurality of movable wireless stations 100 is equal to or more than the predetermined second distance, or the maximum from the combination candidates of the movement routes of the plurality of movable wireless stations 100.

Here, the distance between the plurality of movable wireless stations 100 is defined as the distance between the plurality of movable wireless stations 100 at the time point when the plurality of movable wireless stations 100 are closest to each other. For example, the second calculation unit 404 calculates the position (At0, At1, . . . ), (Bt0, Bt1, . . . ) of the movable wireless stations 100-1 and 100-2 on the movement routes every predetermined time (At) from the combinations of the movement start timing and the movement speed of the movable wireless stations 100-1 and 100-2. In addition, the second calculation unit 404 calculates the distance between the position of the movable wireless station 100-1 and the position of the movable wireless station 100-2 at each time point, and defines the minimum distance as the distance between the plurality of movable wireless stations 100-1 and 100-2.

Note that when the number of the movable wireless stations 100 is three or more, the distance between the plurality of movable wireless stations 100 may be calculated at each time point for the combinations of the movement routes of all selected movable wireless stations 100.

The second calculation unit 404 calculates the distance between the plurality of movable wireless stations 100, for example, for each of the combination candidates of the movement routes of the plurality of movable wireless stations 100 calculated by the first calculation unit 403. In addition, the second calculation unit 404 sets the combinations of the movement timing and the movement speed where the calculated distance is equal to or more than the second distance as the combination candidates of the movement timing and the movement speed. Note that when there is no combination of the movement timing and the movement speed where the calculated distance is equal to or more than the second distance, the second calculation unit 404 sets the combinations of the movement timing and the movement speed where the calculated distance is the maximum as the combination candidates of the movement timing and the movement speed.

In a step S504, the selection unit 405 selects the combination where the movement time or the movement distance of the plurality of movable wireless stations 100 is the minimum or the combination where the movement time or the movement distance of the plurality of movable wireless stations 100 is equal to or less the predetermined value among the calculated combination candidates. For example, the selection unit 405 calculates the movement time (or the movement distance) when the plurality of movable wireless stations 100-1 and 100-2 is moved to the movement destinations by the combination of the movement timing and the movement speed calculated by the second calculation unit 404. Further, the selection unit 405 selects the combination of the movement route, the movement timing and the movement speed of the plurality of movable wireless stations 100-1 and 100-2 where the calculated movement time (or movement distance) is the minimum or equal to or less the predetermined value.

In a step S505, the movement instruction unit 406 instructs the plurality of movable wireless stations 100 to move by using the combination selected by the selection unit 405. For example, the movement instruction unit 406 instructs the plurality of movable wireless stations 100-1 and 100-2 to move to the movement destinations with the movement route, the movement timing, and the movement speed of the plurality of movable wireless stations 100-1 and 100-2 selected by the selection unit 405.

The processing in FIG. 5 allows the control device 10 to instruct the plurality of movable wireless stations 100 on the movement route, the movement timing, the movement speed, and the like, so that the communication quality deterioration due to the interference between the cells or the like does not occur (or hardly occurs) during the movement of the plurality of movable wireless stations 100.

Example 2

Figure 9:
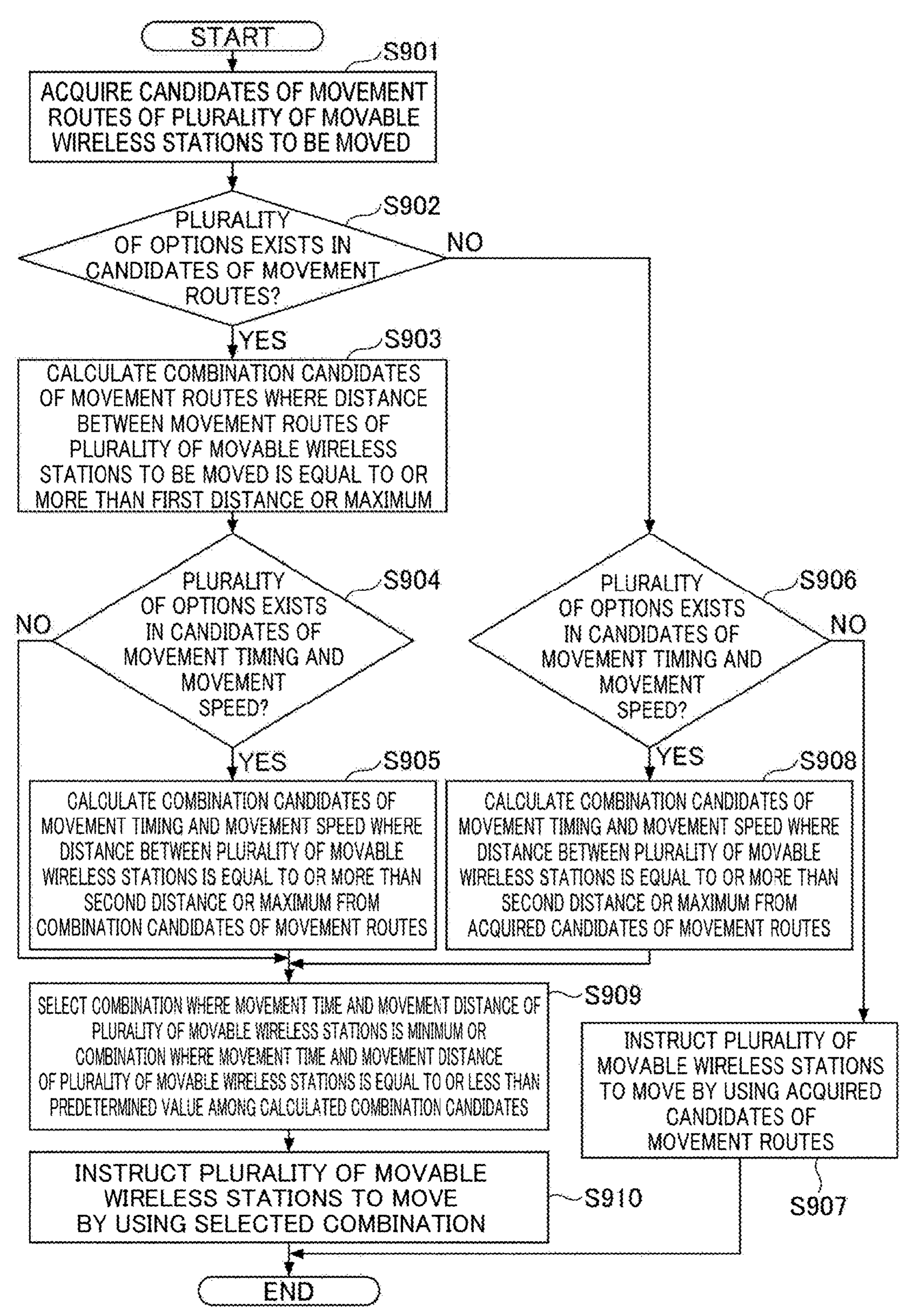
FIG. 9 is a flowchart showing an example of processing of the control device according to an example 2.

FIG. 9 is a flowchart showing an example of processing of the control device according to an example 2. This processing shows an example of more specific processing executed by the control device 10 having the functional configuration described in FIG. 4. Note that since the basic processing content is similar to that of the processing of the control device 10 according to the example 1 described in FIG. 5, detailed description of the processing content similar to that of the example 1 will be omitted, here.

In a step S901, the acquisition unit 402 acquires the candidates of the movement routes of the plurality of movable wireless stations 100 to be moved.

In the step S901, the first calculation unit 403 determines whether or not there is a plurality of options in the candidates of the movement routes acquired by the acquisition unit 402. When there is a plurality of options in the candidates of the movement routes, the first calculation unit 403 shifts the processing to a step S903. On the other hand, when there is no plurality of options in the candidates of the movement routes, the first calculation unit 403 stops execution of the first calculation processing, and shifts the processing to a step S906.

When shifting to the step S903, the first calculation unit 403 executes the first calculation processing that calculate the combination candidates of the movement routes of the plurality of movable wireless stations 100 where the distance between the movement routes of the plurality of movable wireless stations 100 to be moved is equal to or more than the predetermined first distance or the maximum.

In a step S904, the second calculation unit 404 determines whether or not there is a plurality of options in the movement timing and the movement speed for the combinations of the movement routes calculated by the first calculation unit 403. When there is a plurality of options in the movement timing and the movement speed, the second calculation unit 404 shifts the processing to a step S905. On the other hand, when there is no plurality of options in the movement timing and the movement speed, the second calculation unit 404 stops the execution of the second calculation processing and shifts the processing to a step S909.

When shifting to the step S905, the second calculation unit 404 calculates the combination candidates of the movement timing and the movement speed where the distance between the plurality of movable wireless stations 100 is equal to or more than the predetermined second distance or the maximum from the combination candidates of the movement routes of the plurality of movable wireless stations 100.

On the other hand, when the step S902 shifts to the step S906, the second calculation unit 404 determines whether or not there is a plurality of options in the movement timing and the movement speed for the candidates of the movement routes of the plurality of movable wireless stations 100 acquired by the acquisition unit 402. When there is a plurality of options in the movement timing and the movement speed, the second calculation unit 404 shifts the processing to a step S908. On the other hand, when there is no plurality of options in the movement timing and the movement speed, the second calculation unit 404 stops the execution of the second calculation processing, and shifts the processing to a step S907.

When shifting to the step 907, the movement instruction unit 406 instructs the plurality of movable wireless stations 100 to move by using the candidates of the movement routes of the plurality of movable wireless stations 100 acquired by the acquisition unit 402, and terminates the processing.

When shifting to the step S908, the second calculation unit 404 calculates the combination candidates of the movement timing and the movement speed where the distance between the plurality of movable wireless stations 100 is equal to or more than the predetermined second distance or the maximum from the acquired candidates of the movement routes of the plurality of movable wireless stations 100.

When shifting to the step S909, the selection unit 405 selects the combination where the movement time or the movement distance of the plurality of movable wireless stations 100 is the minimum or the combination where the movement time or the movement distance of the plurality of movable wireless stations 100 is equal to or less than the predetermined value among the calculated combination candidates.

In a step S910, the movement instruction unit 406 instructs the plurality of movable wireless stations 100 to move by using the combination selected by the selection unit 405.

The processing in FIG. 9 allows the first calculation unit 403 to execute the first calculation processing when there is a plurality of options in the candidates of the movement routes. In addition, the second calculation unit 404 executes the second calculation processing when there is a plurality of options in the movement timing and the movement speed. Further, the selection unit 405 selects the combination where the movement time or the movement distance of the plurality of movable wireless stations 100 is the minimum or the combination where the movement time or the movement distance of the plurality of movable wireless stations 100 is equal to or less than the predetermined value among the combination candidates of the movement routes calculated by the first calculation unit 403 or the combination candidates of the movement timing and the movement speed calculated by the second calculation unit 404.

<Example of Hardware Configuration>

Figure 10:
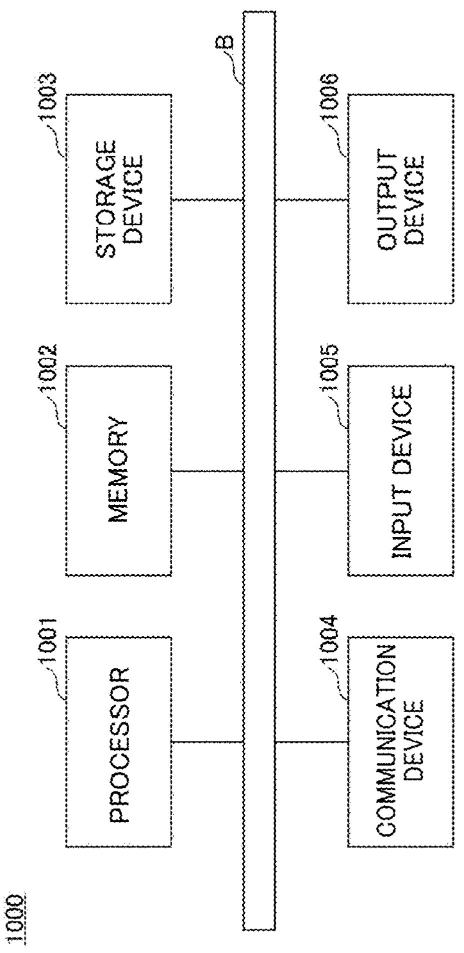
FIG. 10 is a diagram showing an example of a hardware configuration of the control device and the movable wireless station according to the present embodiment.

FIG. 10 is a diagram showing an example of a hardware configuration of the control device and the movable wireless station according to the present embodiment. The control device 10 and the movable wireless station 100 have, for example, a configuration of a computer 1000 as shown in FIG. 10. Note that the movable wireless station 100 has a configuration in which a wireless base station or a wireless relay station having a configuration of the computer 1000 is mounted on a movable device that moves in accordance with control from the computer 1000.

In an example of FIG. 10, the computer 1000 includes a processor 1001, a memory 1002, a storage device 1003, a communication device 1004, an input device 1005, an output device 1006, a bus B, and the like.

The processor 1001 is, for example, an arithmetic device such as a CPU (Central Processing Unit) that realizes various functions by executing a predetermined program. The memory 1002 is a storage medium that is readable by the computer 1000, and includes, for example, a RAM (Random Access Memory), a ROM (Read Only Memory), or the like. The storage device 1003 is a computer-readable storage medium, and may include, for example, an HDD (Hard Disk Drive), an SSD (Solid State Drive), any types of optical discs, a magneto-optical disc, and the like.

The communication device 1004 includes one or more pieces of hardware (communication device) that perform the communications with other devices over a wireless or wired network. The input device 1005 is an input device (for example, a keyboard, a mouse, a microphone, a switch, a button, a sensor, or the like) that receives an input from the outside. The output device 1006 is an output device (for example, a display, a speaker, an LED lamp, or the like) that performs an output to the outside. Note that the input device 1005 and the output device 1006 may be an integrated configuration (for example, an input and output device such as a touch panel display).

The bus B is commonly connected to each component described above, and transmits, for example, address signals, data signals, any types of control signals and the like. Note that the processor 1001 is not limited to the CPU, and may be, for example, a DSP (Digital Signal Processor), a PLD (Programmable Logic Device), or an FPGA (Field Programmable Gate Array).

(Supplements)

The control device 10 and the movable wireless station 100 according to the present embodiment are not limited to realization using a dedicated device, and may be realized by a general-purpose computer. In such a case, this function may be realized by recording the program for realizing this function on a computer-readable recording medium, reading the program recorded on the recording medium into the computer system, and executing the program. Note that the "computer system" mentioned herein includes an OS and hardware such as peripheral equipment.

In addition, the "computer-readable recording medium" includes a portable medium such as a flexible disc, a magneto-optical disc, a ROM and a CD-ROM, and various storage devices such as a hard disk built into the computer system. Further, the "computer-readable recording medium" may include one that dynamically holds the program for a short period of time such as a communication line in the case of transmitting the program via a network such as the Internet or a communication line such as a telephone line or one that holds the program for a certain period of time such as a volatile memory installed in the computer system that serves as a server or a client in that case.

Furthermore, the above-described program may be a program for realizing some of the above-described functions, may be a program capable of realizing the above-described functions in a combination with a program already recorded on the computer system, or may be a program realized by using hardware such as the PLD (Programmable Logic Device) or the FPGA (Field Programmable Gate Array).

Effects of Embodiment

According to the present embodiment, in the wireless communication system including the movable wireless stations, it is possible to reduce the occurrence of the problem such as the degradation of the communication quality due to the interference between the cells or the reduction in the utilization efficiency of the wireless resources during the movement of the movable wireless station.

For example, when the plurality of movable wireless stations 100 uses overlapping frequency bands, it is possible to avoid increase of the interference between the cells and suppress the degradation in the communication quality during the movement of the movable wireless station 100. In addition, when the plurality of movable wireless stations 100 uses non-overlapping frequency bands, it is possible to avoid wasteful overlapping of the communication areas and improve the overall utilization efficiency of the wireless resources.

Summary of Embodiment

The present specification discloses at least a wireless communication method and a wireless communication system of the following items.

(Item 1)

A control device for controlling movable wireless stations, the control device includes

- a first calculation unit configured to calculate combination candidates of movement routes of a plurality of movable wireless stations where a distance between the movement routes of the plurality of movable wireless stations to be moved is equal to or more than a first distance or the maximum,
- a second calculation unit configured to calculate combination candidates of movement timing and movement speed where the distance between the plurality of movable wireless stations is equal to or more than a second distance or the maximum from the combination candidates of the movement routes of the plurality of movable wireless stations, and
- a movement instruction unit configured to instruct the plurality of movable wireless stations to move by using a combination where a movement time or a movement distance of the plurality of movable wireless stations is the minimum or a combination where the movement time or the movement distance of the plurality of movable wireless stations is equal to or less than a predetermined value among the combination candidates calculated by the first calculation unit or the second calculation unit.

(Item 2)

The control device according to claim 1, wherein the second calculation unit calculates the combination candidates of the movement timing and the movement speed of the plurality of movable wireless stations from the combination candidates of the movement routes of the plurality of movable wireless stations calculated by the first calculation unit.

(Item 3)

The control device according to claim 1, wherein the second calculation unit calculates the combination candidates of the movement timing and the movement speed of the plurality of movable wireless stations when there is a plurality of options in the movement timing and the movement speed of the plurality of movable wireless stations.

(Item 4)

The control device according to claim 1, wherein the first calculation unit calculates the combination candidates of the movement routes when there is a plurality of options in the movement routes of the plurality of movable wireless stations.

(Item 5)

The control device according to claim 1, wherein the first distance and the second distance are predetermined distances so that deterioration in communication quality due to interference between cells of the plurality of movable wireless stations is equal to or less than a predetermined value.

(Item 6)

A wireless communication system including movable wireless stations and a control device for controlling the movable wireless stations, wherein the control device includes a first calculation unit configured to calculate combination candidates of movement routes of a plurality of movable wireless stations where a distance between the movement routes of the plurality of movable wireless stations to be moved is equal to or more than a first distance or the maximum, a second calculation unit configured to calculate combination candidates of movement timing and movement speed where the distance between the plurality of movable wireless stations is equal to or more than a second distance or the maximum from the combination candidates of the movement routes of the plurality of movable wireless stations, and a movement instruction unit configured to instruct the plurality of movable wireless stations to move by using a combination where a movement time or a movement distance of the plurality of movable wireless stations is the minimum or a combination where the movement time or the movement distance of the plurality of movable wireless stations is equal to or less than a predetermined value among the combination candidates calculated by the first calculation unit or the second calculation unit, and the movable wireless station includes a movement control unit configured to move the movable wireless stations in accordance with an instruction from the control device.

(Item 7)

A control method for controlling movable wireless stations, the control method includes the steps executed by a computer of a first calculation processing of calculating combination candidates of movement routes of a plurality of movable wireless stations where a distance between the movement routes of the plurality of movable wireless stations to be moved is equal to or more than a first distance or the maximum, a second calculation processing of calculating combination candidates of movement timing and movement speed where a distance between the plurality of movable wireless stations is equal to or more than a second distance or the maximum from the combination candidates of the movement routes of the plurality of movable wireless stations, and a movement instruction processing of instructing the plurality of movable wireless stations to move by using a combination where a movement time or a movement distance of the plurality of movable wireless stations is the minimum or a combination where the movement time or the movement distance of the plurality of movable wireless stations is equal to or less than a predetermined value among the combination candidates calculated by the first calculation unit or the second calculation unit.

Although the present embodiment has been described above, the present invention is not limited to such a specific embodiment, and various modifications and changes are possible within the scope of the gist of the present invention described in the claims.

For example, in each of the above embodiments, an example in which the wireless station is the movable wireless station has been described, but the wireless station may include a fixed wireless station. When the fixed wireless station is included, the control device 10 regards the fixed wireless station as the movable wireless station 100 which does not move, executes, for example, processing of FIG. 5 and FIG. 9, and can calculate the movement method of other movable wireless stations 100.

REFERENCE SIGNS LIST

1 Wireless communication system
10 Control device
100, 100-1, 100-2 Movable wireless station
403 First calculation unit
404 Second calculation unit
405 Selection unit
406 Movement instruction unit

The invention claimed is:

1. A control apparatus for controlling movable wireless stations, the control apparatus comprising:

a processor; and a memory that includes instructions, which when executed, cause the processor to execute:

calculating combination candidates of movement routes of a plurality of movable wireless stations where a distance between the movement routes of the plurality of movable wireless stations is equal to or more than a first distance or a maximum distance;

calculating combination candidates of movement timing and movement speed where the distance between the plurality of movable wireless stations is equal to or more than a second distance or a maximum distance from the combination candidates of the movement routes of the plurality of movable wireless stations; and instructing the plurality of movable wireless stations to move by using a combination where a movement time or a movement distance of the plurality of movable wireless stations is the minimum or a combination where the movement time or the movement distance of the plurality of movable wireless stations is equal to or less than a predetermined value among the calculated combination candidates.

2. The control apparatus according to claim 1, wherein the calculating of the combination candidates of the movement timing and the movement speed includes calculating the combination candidates of the movement timing and the movement speed of the plurality of movable wireless stations from the combination candidates of the calculated movement routes of the plurality of movable wireless stations.

3. The control apparatus according to claim 1, wherein the calculating of the combination candidates of the movement timing and the movement speed includes calculating the combination candidates of the movement timing and the movement speed of the plurality of movable wireless stations when there is a plurality of options in the movement timing and the movement speed of the plurality of movable wireless stations.

4. The control apparatus according to claim 1, wherein the calculating of the combination candidates of movement routes includes calculating the combination candidates of the movement routes when there is a plurality of options in the movement routes of the plurality of movable wireless stations.

5. The control apparatus according to claim 1, wherein the first distance and the second distance are predetermined distances so that deterioration in communication quality due to interference between cells of the plurality of movable wireless stations is equal to or less than a predetermined value.

6. A radio communication system including movable wireless stations and a control apparatus for controlling the movable wireless stations, wherein the control apparatus comprises a first processor; and a first memory that includes instructions, which when executed, cause the first processor to execute:

calculating combination candidates of movement routes of a plurality of movable wireless stations where a distance between the movement routes of the plurality of movable wireless stations to be moved is equal to or more than a first distance or a maximum distance, calculating combination candidates of movement timing and movement speed where the distance between the plurality of movable wireless stations is equal to or more than a second distance or a maximum distance from the combination candidates of the movement routes of the plurality of movable wireless stations, and instructing the plurality of movable wireless stations to move by using a combination where a movement time or a movement distance of the plurality of movable wireless stations is the minimum or a combination where the movement time or the movement distance of the plurality of movable wireless stations is equal to or less than a predetermined value among the calculated combination candidates, and the movable wireless station comprises a second processor; and a second memory that includes instructions, which when executed, cause the second processor to execute:

moving the movable wireless station in accordance with an instruction from the control apparatus.

7. A control method executed by a computer for controlling movable wireless stations, the control method comprising:

a first calculation processing of calculating combination candidates of movement routes of a plurality of movable wireless stations where a distance between the movement routes of the plurality of movable wireless stations to be moved is equal to or more than a first distance or a maximum distance;

a second calculation processing of calculating combination candidates of movement timing and movement speed where a distance between the plurality of movable wireless stations is equal to or more than a second distance or a maximum distance from the combination candidates of the movement routes of the plurality of movable wireless stations; and a movement instruction processing of instructing the plurality of movable wireless stations to move by using a combination where a movement time or a movement distance of the plurality of movable wireless stations is the minimum or a combination where the movement time or the movement distance of the plurality of movable wireless stations is equal to or less than a predetermined value among the combination candidates calculated by the first calculation processing or the second calculation processing.

* * * * *